United States Patent [19]
Kato et al.

[11] 3,881,830
[45] May 6, 1975

[54] COMBINATION PIPE JOINT STRUCTURE

[75] Inventors: Katsumi Kato, Kyoto; Naoaki Sato, Shiga, both of Japan

[73] Assignee: Takiron Co., Ltd., Osaka-shi, Osaka, Japan

[22] Filed: Sept. 26, 1973

[21] Appl. No.: 400,989

[30] Foreign Application Priority Data
Sept. 26, 1972 Japan.................. 47-114119[U]
Mar. 12, 1973 Japan.................. 48-32190[U]
Mar. 12, 1973 Japan.................. 48-32191[U]

[52] U.S. Cl. ........................ 403/171; 403/295
[51] Int. Cl. .................................. F16b 7/00
[58] Field of Search .......... 403/170, 171, 172, 176, 403/169, 173, 295, 292; 211/182

[56] References Cited
UNITED STATES PATENTS

| | | | |
|---|---|---|---|
| 3,000,656 | 9/1961 | Hollaender | 403/298 |
| 3,211,481 | 10/1965 | Cadovius | 403/171 |
| 3,218,097 | 11/1965 | Bowers et al. | 403/295 |
| 3,255,721 | 6/1966 | Peterschmidt | 403/173 X |

FOREIGN PATENTS OR APPLICATIONS

| | | | |
|---|---|---|---|
| 377,619 | 6/1923 | Germany | 403/171 |
| 1,276,390 | 10/1961 | France | 403/176 |

*Primary Examiner*—Andrew V. Kundrat
*Attorney, Agent, or Firm*—Sughrue, Rothwell, Mion, Zinn & MacPeak

[57] ABSTRACT

Herein disclosed is a combination pipe joint structure which finds a wide variety of applications in joining pipes. The pipe joint structure comprises a pair of pipe joint units, each of which has a joint surface for being joined thereat to each other to form a unitary structure. Each of the pipe joint units includes a base portion and a plurality of foot portions extending from the base portion on the joint surface and angularly spaced from each other. Each of the foot portions has an outer peripheral surface sized and shaped to fixedly hold thereon a pipe when the pair of pipe joint units are jointed to each other and when it is subsequently fitted into the pipe. If desired, at least one of the pipe joint units may further include at least one foot extending from the base portion at an angle from the joint surface and having an outer peripheral surface sized and shaped to fixedly hold thereon a pipe when it is fitted into the pipe. The pipe joint structure thus formed may have various shapes and the numbers of both the foot portions and the feet may also be desirably varied, so that the resultant structure of the joined pipes can have various shapes suitable for various purposes. If desired, moreover, suitable fixing means may be mounted on the foot portions and on the feet so as to ensure fixture with the corresponding pipe. And, an adhesive agent may be filled in a space, which is defined by the foot portions and the feet, by the corresponding pipe and by the fixing means, for sealing off the pipe.

1 Claim, 13 Drawing Figures

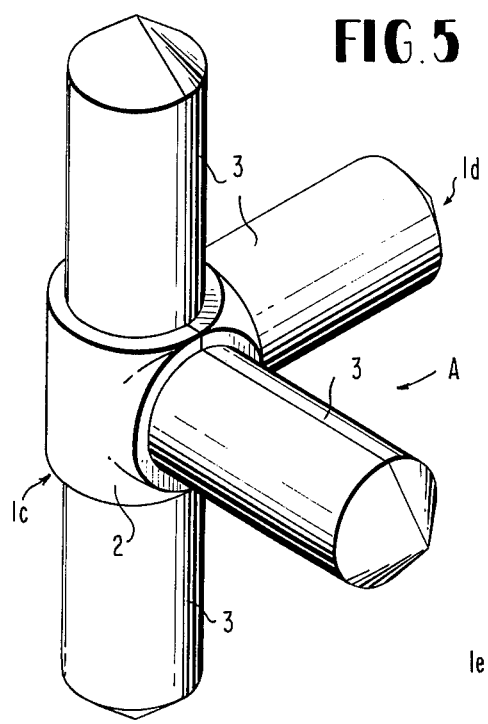
FIG.5
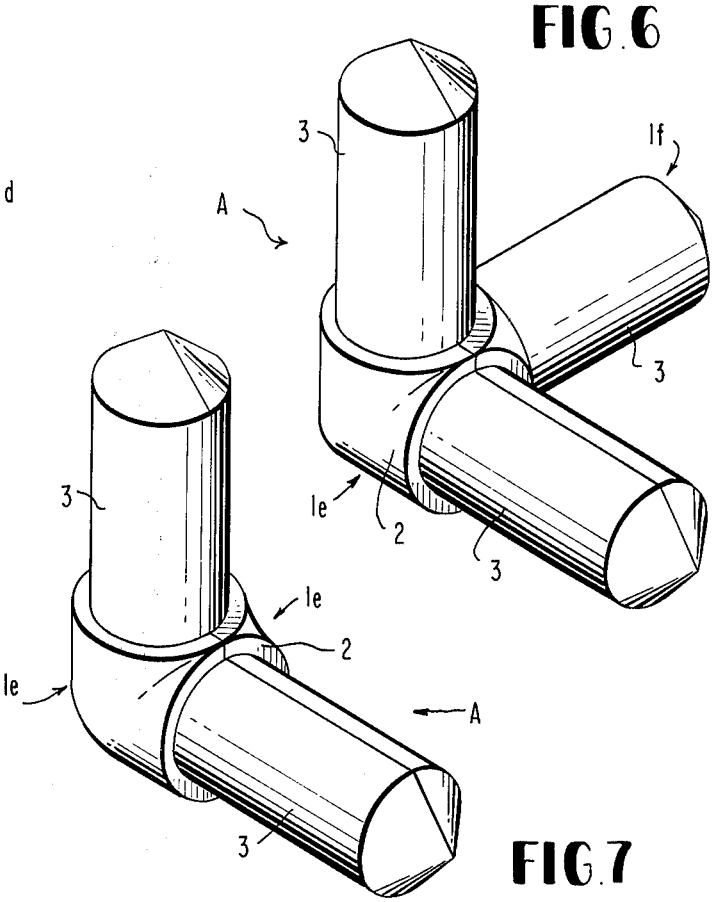
FIG.6
FIG.7
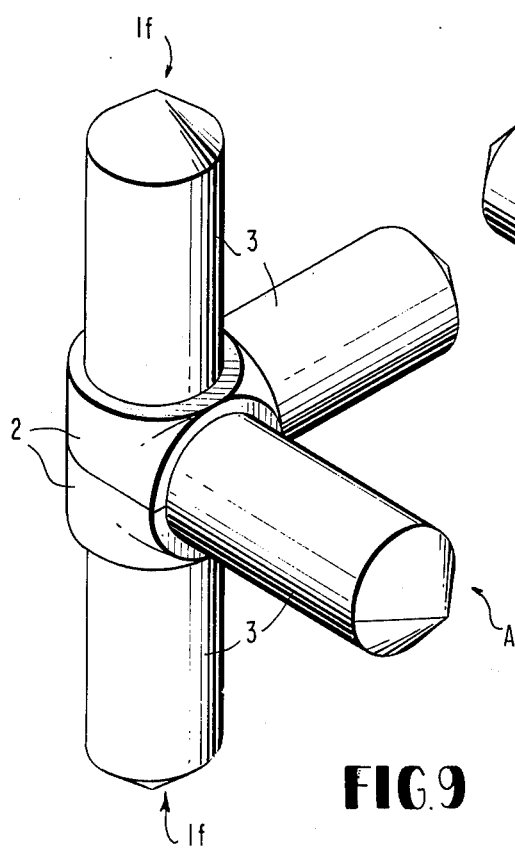
FIG.9
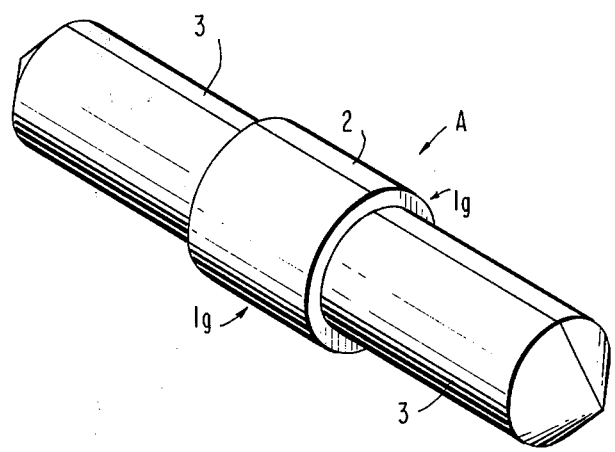
FIG.8

COMBINATION PIPE JOINT STRUCTURE

BACKGROUND OF THE INVENTION

1. Field of the Invention

The present invention relates to a combination pipe joint structure for jointing thereat a plurality of pipes so as to form a space frame having a variety of shapes.

2. Description of the Prior Art

In order to construct a space frame with use of pipes, there have been proposed several pipe joint structures as follows:

Among them, one of the most popular pipe joint structure is composed of two dividable halves, between which a pipe to be jointed is held. These two halves are then fixed to each other by the use of suitable fastening means such as a screw. The fixture between the pipe and the pipe joint structure can be ensured by fixing the screw. However, this proposal cannot be free from serious disadvantages. That is, the fixture is considerably fragile to reduce durability when an external force is applied thereto in a direction normal to a joint plane between the two halves. With this external force, the joint structure itself may be deformed to weaken the joint, and in an extreme case the particular structure is broken to separate the pipe therefrom. In the case, moreover, where an electroplated pipe or a pipe having a coating of a synthetic resin such as vinyl chloride is employed, the contacting end between the joint structure and the pipe will have its electroplated surface or coating damaged or worn off, with resultant formation of rust. Still moreover, the assembling process will inevitably be complicated by the fixing step of the screw.

Another popular proposal is a pipe joint structure of a cubic or spherical body, on the outer surface of which a suitable number of tapered projections are formed. Each of the tapered projections is fitted into a pipe to be jointed. This proposal could be appreciated in its simplified assembling process just consisting of the fitting step. In the opposite aspect, however, the contact area between the pipe and the joint structure is so highly limited as to make the joint inbetween insufficient in strength and according to invite separation of the two. In order to eliminate this drawback, the pipe also has to be fixed to the particular structure with use of a screw or the like. This is prominent especially in the case where the pipe has a cylindrical shape. In this case, more specifically, the limited contact area will lead to feasible rotation of the pipe in the structure, so that considerable inconvenience will be experienced in the assembling process and in the actual use. And, separation of the pipe from the structure will often be encountered.

As a modification of the latter proposal, on the other hand, a longitudinal groove is formed on the tapered projections, and a corresponding projection is formed on the inner wall of the pipe to be fitted into the groove. This construction could be appreciated in that the possible separation, which might otherwise take place, due to the rotational motion of the pipe relative to the joint structure can be prevented. However, this construction is accompanied by additional drawbacks as exemplified in that the relative shape and size of the joint structure and the pipe can hardly be changed, and in that an additional process is required for machining the elements thus involved. As a result, the modified proposal under discussion is found remarkably uneconomical and incompatible with practical purposes.

In the latter proposal and in its modification, another uneconomical aspect is commonly found in that the joint structure to be used has to be of the same number as the joint portions of the space frame being sought for.

SUMMARY OF THE INVENTION

It is therefore intended in the present invention to eliminate the foregoing drawbacks concomitant with the conventional pipe joint structures.

With this in mind, a primary object of the invention is to provide a combination pipe joint structure which is composed of two dividable halves. These two halves are jointed to each other to form a unitary structure having shapes suitable for a variety of practical applications. This simple construction can reduce the number of the parts to constitute the joint structure, and makes it possible to form a variety of space frames.

Another object of the invention is to provide an economical combination pipe joint structure which can be easily manufactured and assembled with a resultant beautiful finish.

Still another object is to provide a combination pipe joint structure of the above type which can ensure fixture with the pipe so as to form a strong space frame.

A further object is to provide a combination pipe joint structure of the above type which can safely cover and protect the end of the pipe to be jointed, and which can improve air-tightness of the pipe so that possible seeping of a liquid such as water into the pipe may be prevented.

In order to accomplish the above objects, the pipe joint structure according to a major aspect of the present invention comprises a pair of pipe joint units, each of which has a joint surface for being jointed thereat to each other to form a unitary structure. Each of the pipe joint units includes a base portion and a plurality of foot portions extending from the base portion on the joint surface and angularly spaced from each other. Each of the foot portions has an outer peripheral surface sized and shaped to fixedly hold thereon a pipe when its corresponding halves are jointed to each other and when it is subsequently fitted into the pipe. If desired, at least either of the pipe joint units may further include at least one foot extending from the base portion at an angle from the joint surface and having an outer peripheral surface sized and shaped to fixedly hold thereon a pipe when it is fitted into the pipe. The pipe joint structure thus formed may have various shapes and the numbers of both the foot portions and the feet may also be desirably varied, so that the resultant structure of the jointed pipes can have various shapes suitable for various purposes. If desired, moreover, suitable fixing means may be mounted on the foot portions and on the foot so as to ensure fixture with the corresponding pipe. And, an adhesive agent may be filled in a space, which is defined by the foot portions and the feet, by the corresponding pipe and the fixing means, for sealing off the pipe.

BRIEF DESCRIPTION OF THE DRAWINGS

Other objects and advantages of the present invention will be apparent from the following description taken in conjunction with the accompanying drawings, in which:

FIGS. 3 to 9 are perspective views showing several modifications of the present pipe joint structure which are formed by jointing a pair of pipe joint units of various shapes;

DESCRIPTION OF THE PREFERRED EMBODIMENTS

The combination pipe joint structure according to the present invention will now be described with reference to the accompanying drawings.

Indicated at reference letter A is the present joint structure, which comprises a pair of dividable pipe joint units 1. These pipe joint units 1 includes a base portion 2 and a plurality of foot portions 3 which extend from the base portion 2 and which are suitably angularly spaced from each other for mounting thereon a pipe (not shown) to be jointed. The shape of the pipe joint units 1 may be varied in accordance with the number and the direction of the pipes to be jointed.

The joint structure A is produced by pressing an iron or aluminum plate, by iron or aluminum casting, by die casting, by plastic injection moulding or by the use of reinforced plastics. The pipe joint units 1 are, on the other hand, made to have their joint surfaces open and to have their resultant unitary structure hollowed, thus reducing its weight and material.

Since the foot portions 3 of the joint structure A is to be fitted into a pipe to be jointed, the root portion thereof adjacent the base portion 2 is made to have substantially the same transverse area or the same diameter as that of the inner space of the pipe and it is reduced or tapered towards its leading end so that the fitting action into the pipe may be made easier. The leading end is made to have a conical shape. Although the foot portions 3 are shown cylindrical for cylindrical pipes, for illustrative purposes only, it may be rectangular for rectangular pipes. As shown, the base portion 2 may preferably have a thickened end which has the same thickness as that of the pipe for abutting on the inner end of the pipe with its outer peripheral surface smoothly merging into the pipe. Although, on the other hand, the foot portions 3 are shown perpendicular to each other, the inclinations inbetween may have a desirable value such as 60° or 45°.

Figure 3:
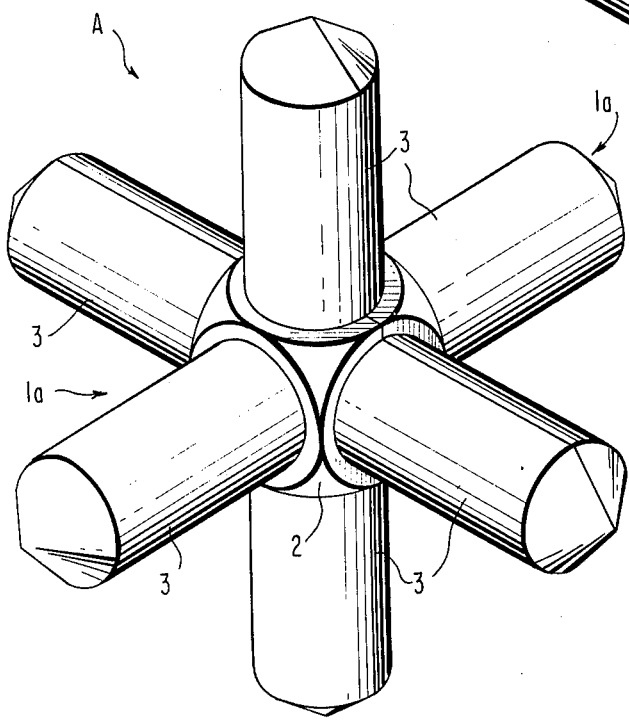

The joint structure A may have a variety of shapes or configurations, which will be described in the following. Where a pair of joint units 1a and 1a each having one additional foot are jointed to each other, a hexagonal joint structure can be obtained, as shown in FIG. 3.

Figure 4:
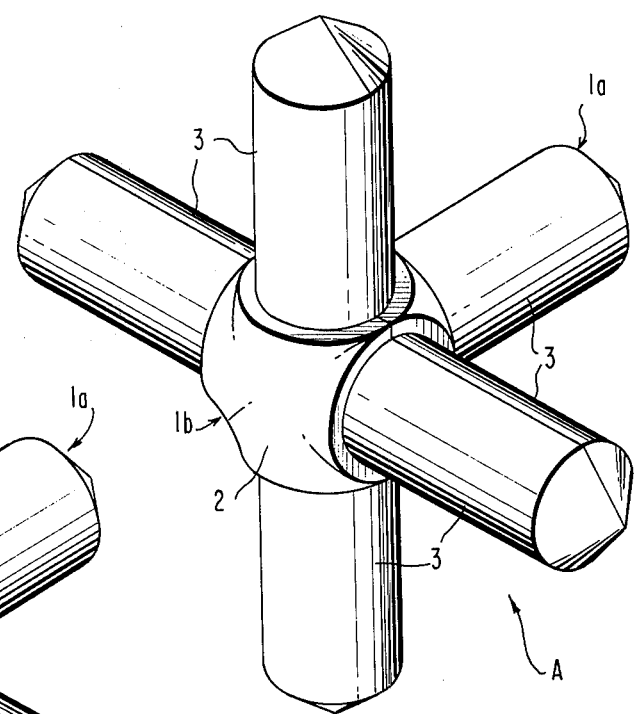

Where, on the other hand, one joint unit 1b having no additional foot is used to be jointed to the joint unit 1a, a pentagonal joint structure of FIG. 4 is obtainable. Although not shown, the use of the joint units 1b and 1b will produce a cross joint structure.

Where both a joint unit 1c with three foot portions and a joint unit 1d having an additional foot are combined with each other, a modified cross joint structure can be obtained, as shown in FIG. 5. Likewise, ternary or tetragonal joint structure is obtainable by combining a pair of similar joint units 1c or 1d with each other.

Where, moreover, an L shaped joint unit 1e is used together with an L shaped joint unit 1f having an additonal foot, a ternary joint structure of FIG. 6 can be obtained. The paired use of the joint unit 1e or 1f will produce a joint structure of FIG. 7 or a cross joint structure of FIG. 9, respectively. The latter construction of FIG. 9 is similar to that of FIG. 5, which is composed of the joint units 1c and 1d. This will imply that the joint unit 1d can be eliminated from the stand point that it is desirable to minimize the number or variation of the joint units 1.

On the other hand, the use of paired linear joint units 1g will produce a linear joint structure of FIG. 8. Another ternary or cross joint structure (not shown) can be obtained with use of a linear joint unit having an additional foot. The ternary or cross joint unit thus obtained can be replaced, respectively, by the paired use of the joint units 1c and 1b. In view of this fact, the linear joint unit with an additional foot can be dispensed with.

In order to ensure fixture with the pipe, on the other hand, both of the foot portions 3 and the foots have their leading peripheral walls formed with at least one bore. At least one corresponding bore is also formed in the peripheral walls of the pipes to be jointed to each other. The foot of the pipes is positioned to align with that of the foot portions or the feet, so that a nut may be inserted into the two corresponding bores from the outside. As an alternative, a pair of leaf springs may be inserted into a leading portion of a clearance which is defined between the corresponding halves of the foot portions 3.

Moreover, a suitable fixing element may desirably be mounted on the leading outer periphery of the foot portions 3 and the feet so as to ensure fixture with the corresponding pipe. The fixing element may be a cap or lock ring made of a flexible material such as metal or synthetic resin. The lock ring may preferably be peripherally separated at one portion so as to augment its flexibility. If desired, a projection to be fitted in the bore may be formed on the inner peripheral wall of the pipe to improve the fixture inbetween.

Figure 10:
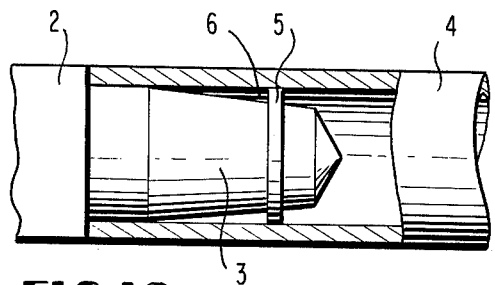
FIG. 10 is a partially cut-away view showing one embodiment of a foot portion or a foot for fixing a pipe to the outer peripheral surface thereof according to the present invention.
Figure 11:
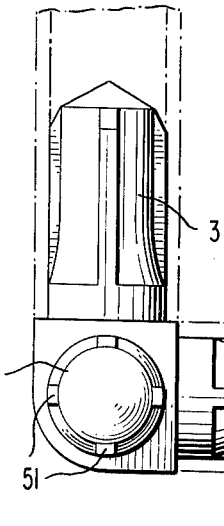
FIG. 11 is similar to FIG. 10 but shows another embodiment.

Referring now to FIGS. 10 and 11 some embodiments of this invention facilitating more strong fixation on the connection between foots of the joint structure A and pipes to be connected with the foots are described hereinafter; an annular projection 5 may be formed on the leading outer periphery of the foot portions 3 or the feet, and, as an alternative, a plurality of linear projections 51 may be formed on the outer periphery of the same. In the former embodiment of FIG. 10, the annular projection 5 has the same transverse area or diameter as that of the inner space of the pipe 4, thus effecting two portion contact inbetween. Then, an enclosed space 6 is formed which is defined by the outer peripheral surface of the foot portions 3 and the feet, by the inner peripheral surface of the pipe 4 and by the annular projection 5. A suitable adhesive agent is filled in the particular space 6 to further secure the fixture inbetween. In the latter embodiment of FIG. 11 the linear projections 51 are arranged to run logitudinally of the foot portions 3 or the feet and have such a transverse extension or diameter as is equal as a whole to that of the inner space of the pipe 4.

Figure 13:
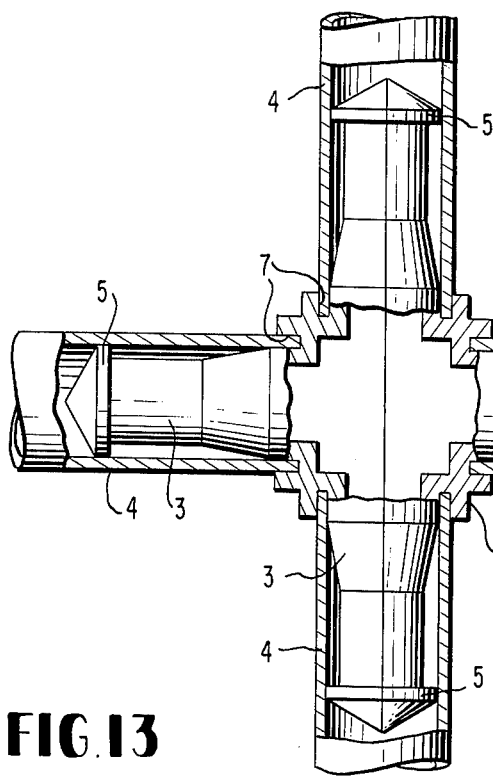
FIG. 13 is a partially cut-away view showing a relation of the modification of FIG. 12 with a pipe to be jointed thereto.
Figure 12:
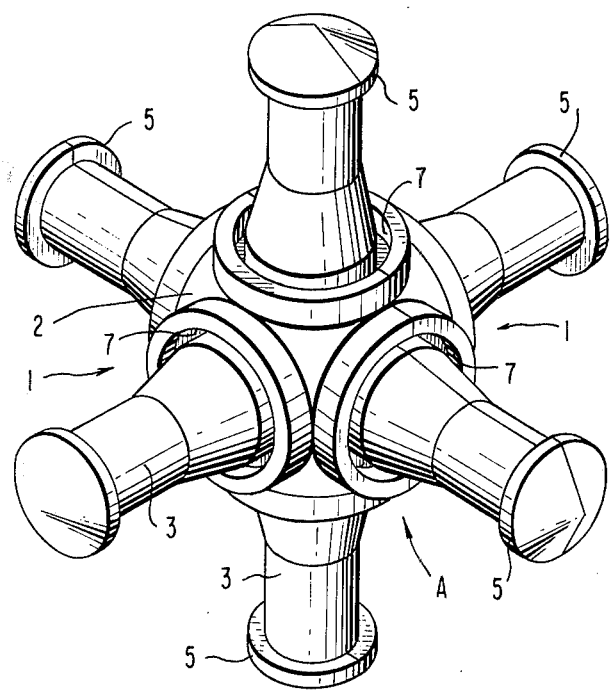
FIG. 12 is an assembled perspective view showing another modification of the present pipe joint structure.

Turning now to FIGS. 12 and 13, the base portion 2 of the joint unit 1 may preferably be formed with an annular projection which extends therefrom longitudinally outwardly of one of the foot portions 3 or the feet for forming inbetween an annular groove 7. With this construction arrangement, the end of the pipe 4 is fittedly received in the annular groove 7 so as to secure sealing in the pipe 4. Thus, possible leakage of corrosive gases or liquid into the pipe 4 can be prevented to maintain the strength and durability of the pipe 4 for a prolonged period of time.

Figure 1:
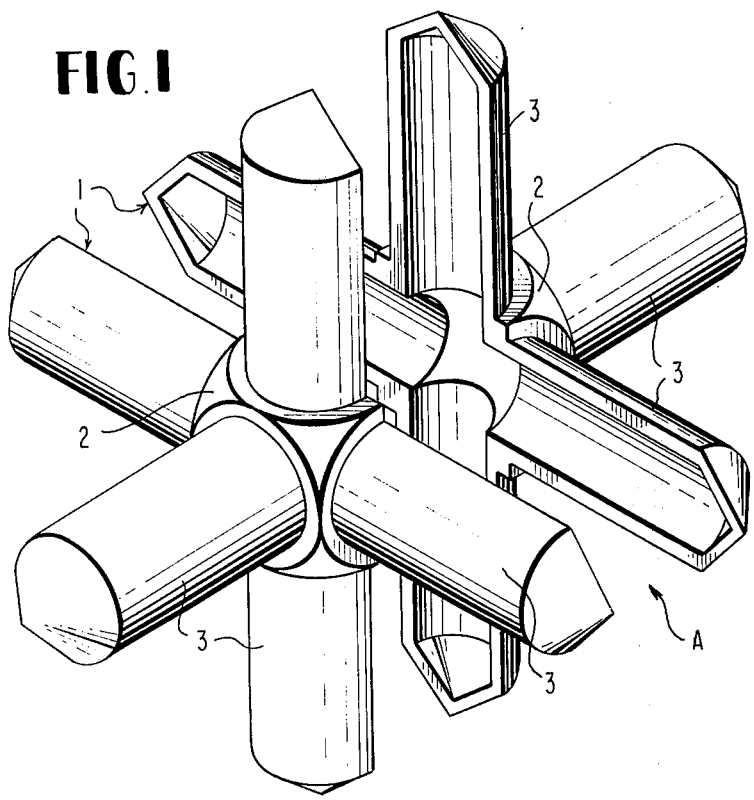
FIG. 1 is an exploded perspective view showing an embodiment of the combination pipe joint structure according to the present invention.
Figure 2:
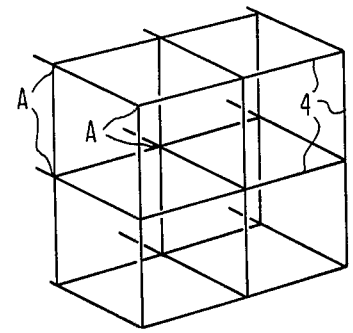
FIG. 2 is a diagrammatical line view showing a space frame which is constructed with use of the present pipe joint structure.

AS has been described in detail in the above, the present joint structure A can have a wide variety of shapes or configulations by combining a limited number of joint units 1 of similar or different constructions with each other in accordance with the desired joint conditions of the pipes 4. A variety of space frames can be obtained with use of the present joint structures A and the pipes 4, and one embodiment such as a rack or jungle gym will be shown in FIG. 2, for illustrative purposes only.

According to a feature of the present invention, it should be appreciated that a variety of pipe joint structures having a plurality of pipe-fixing foot portions 3 and feet desirably angularly spaced from each other can be obtained by combining the dividable joint units 1 of similar or different constructions with each other. The simple change of the partner of the joint units 1 will produce a number of joint structures having linear to hexagonal shapes. The reduction in the number of the joint units will allow simple construction of the resultant joint structure. This simplicity will make the production process simpler and will reduce the production cost. The jointing action can be, on the other hand, performed by simply fitting the foot portions or the feet into the corresponding pipe, thus dispensing with a special fitting such as a nut and with a special tool therefor.

With this construction arrangement, the present invention should also be appreciated in that a major portion of the joint structure can be hidden under the jointed pipes, so that the resultant overall finish can be made more beautiful. Thus, the allowable tolerance limits of the outer diameter of the pipes used can be considerably widened, and the existence and kind of the coating on the pipes can be made almost free.

What is claimed is:

1. A combination pipe joint structure comprising:

a pair of complementary pipe joint half units, each having a joint surface for being joined thereat to each other to form a unitary structure, each of said pipe joint units including a base portion and a plurality of foot portions extending from said base portion on said joint surface and angularly spaced from each other, complementary foot portions forming cylindrical feet, each of said foot portions having an outer peripheral surface sized and shaped to fixedly hold thereon a pipe when its corresponding halves are joined to each other and when it is subsequently fitted into the pipe, so that a plurality of pipes of the same number as that of the foot portions may be joined to each other, at least one of said pipe joint units further including at least one other foot extending from the base portion at an angle from the joint surface, each foot of said combination pipe joint structure being cylindrical in form including a first outer peripheral surface portion near the base of a diameter substantially equal to the inner diameter of the pipe and adapted to receive the same and having a tapered portion extending axially outwardly therefrom, and further having a tip portion with a diameter substantially equal to the inner diameter of said pipe, whereby said pipe is fitted onto said foot with contact therebetween at longitudinally spaced positions, and wherein said base portion at each foot location is provided with an annular projection which extends radially outward therefrom concentrically about the foot and forming with said foot, an annular groove within which the end of a corresponding pipe is fittedly received.

* * * * *